Sept. 8, 1936.  H. A. ROSE  2,053,445
ELECTRICAL CONTROL SYSTEM
Filed June 29, 1933
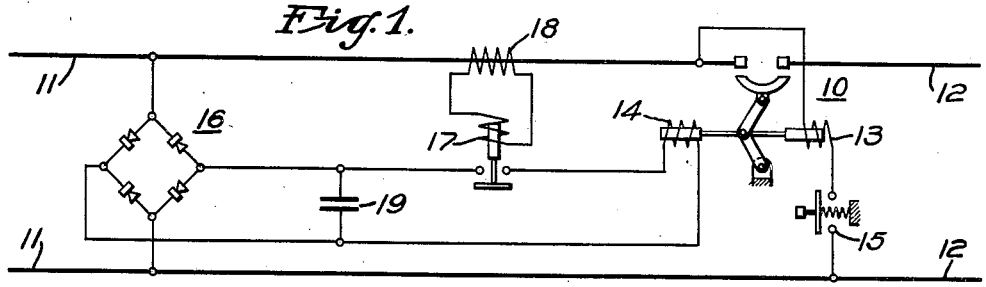
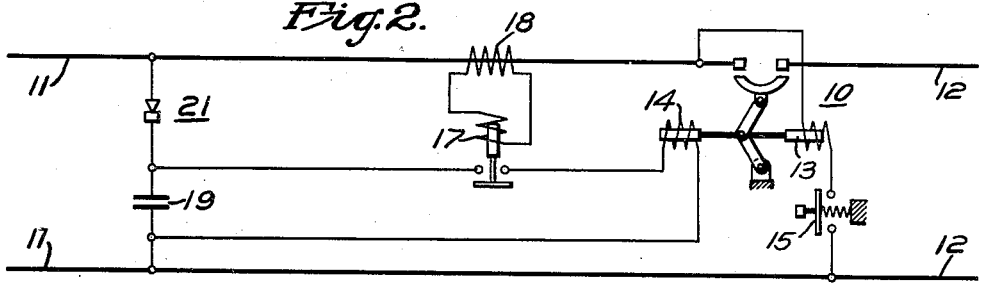
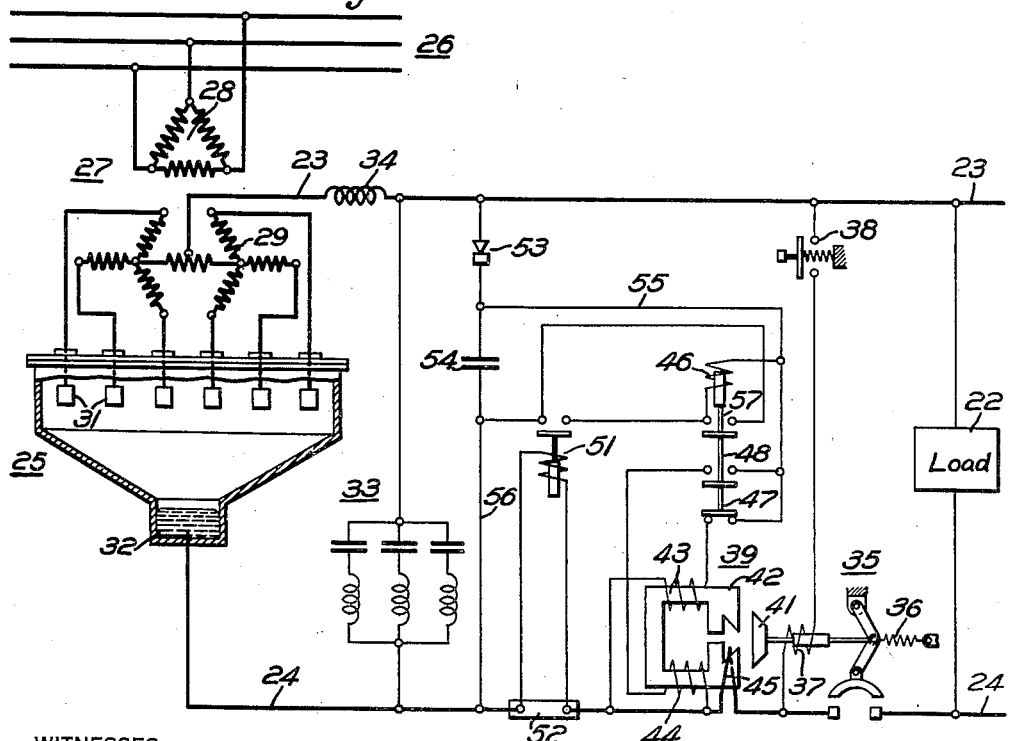
WITNESSES:
R. J. Fitzgerald
Wm. C. Groome
INVENTOR
Herbert A. Rose.
BY M. Crawford
ATTORNEY Patented Sept. 8, 1936

2,053,445

UNITED STATES PATENT OFFICE 2,053,445

ELECTRICAL CONTROL SYSTEM

Herbert A. Rose, Pittsburgh, Pa., assignor to Westinghouse Electric & Manufacturing Company, East Pittsburgh, Pa., a corporation of Pennsylvania Application June 29, 1933, Serial No. 678,217

4 Claims. (Cl. 175—294)

My invention relates, generally, to electrical control systems, and, more particularly, to systems for controlling the operation of relays, switches and circuit interrupters utilized in electrical systems in such manner as to insure desired positive operation or control thereof regardless of whether or not their normal supply of operating voltage has failed, prior to the time it is desired to operate them, or has become ineffective to operate the devices or maintain them in a desired predetermined operating position.

In many instances, it is desirable and often times necessary to provide for effecting the positive control of relays, switches, circuit breakers and the like, which are normally controlled by voltage obtained from a supply source, load circuit or power bus with which they are associated, regardless of whether or not the normal voltage of their energy source falls to a low or zero value, as the result of a short circuit, or becomes erratic or unstable and fluctuates between such limits as to cause undesirable operations of relays and the like in the system.

Such positive control of relays, switches, circuit breakers and the like is necessary in order to cause the system to function safely and positively under all conditions so that regardless of the kind or source of system disturbance, the proper relays will be operated or prevented from operating, as the case may be, at a critical time.

In addition to the need for positive control of relays, and the like, under short circuit and heavy load conditions, the use of vapor electric devices, such, for example, as mercury arc power rectifiers has also created a need for this positive control because of voltage and arc instability which may occur under certain adverse conditions of operation. Especially is this the case where high-current capacity telephone interference mitigation apparatus is employed.

When such mitigation apparatus is used, instability usually results when the load on the power rectifier decreases below a low or critical value. The causes of such instability are fully explained in my copending application, Serial No. 648,205, filed December 21, 1932 entitled Electrical distribution systems and need not be repeated in detail in this specification, since the present invention does not affect or attempt to correct such instability in any way.

It may be stated, however, that such instability causes the voltage on the load circuit or system to fluctuate badly and at times disappear entirely, which condition creates a great need for a system for positively controlling the operation of relays, switches and circuit breakers used in the system.

Accordingly, it is the object of my invention, generally stated, to provide a control system for relays, switches and circuit interrupters and the like which shall be simple and effective in operation and economical to manufacture and install.

A more specific object of my invention is to provide for energizing an electro-responsive device to insure its desired operation even though its normal supply of operating voltage has become ineffective or has failed previous to the time it is desired to operate such device.

Another object of my invention is to provide for utilizing an energy storage device as an auxiliary source of voltage to operate an electro-responsive device such, for example, as a control relay, switch or the trip coil of a circuit interrupter in the event that its normal source of control voltage has failed or become ineffective and also to prevent relays, switches and circuit interrupters from opening under unstable voltage conditions of the systems when it is desirable that such apparatus remain in a closed or other predetermined condition.

A further object of my invention is to provide in an electrical system including a vapor-electric device an interrupter for controlling the direct-current load circuit, for effecting the opening operation of the interrupter regardless of whether or not the bus voltage or other control voltage has failed or become ineffective as the result of a short circuit, or the like, and to prevent the opening of the interrupter and other control devices in the event the load circuit voltage becomes unstable and varies over such wide limits as to cause the circuit interrupter and other devices to open at an undesirable time because of insufficient bus voltage.

In practicing my invention, I utilize a condenser which is continuously charged from the load bus or circuit through a rectifier and so connect the rectifier and condenser to the operating coils of control relays, tripping and holding coils for interrupters and the like, in such manner that upon failure or instability of the load circuit voltage, the condenser automatically discharges through the coils of the relays it is desired to operate or through the holding or tripping coils of the interrupter to effect its operation or maintain it closed, as the case may be. Under normal operating conditions, the current for operating the various relays, etc. is obtained from the load bus or circuit through the rectifier, and the condenser functions as a reserve source of voltage in case the load or power circuit voltage falls below a predetermined value.

It is to be understood, however, that while I have illustrated an electric valve and condenser arrangement as being the preferred form or embodiment of my invention, other forms of electrical energy storing or energy translating means may be used in place of the condenser to function as a reserve source of energy, such for example, an electric valve and battery arrangement.

The foregoing and other objects of my invention may be more readily understood by referring to the following detailed description in connection with the drawing, wherein:

Figure 1 is a diagrammatic view of an electrical control system embodying the principal features of my invention.

Fig. 2 shows a modification of the system of Fig. 1, and

Fig. 3 is a diagrammatic view of an electrical distribution system including a mercury-arc power rectifier showing the way in which my invention may be utilized to control the operation of relays, the circuit interrupter and other devices, under unusual and subnormal operating conditions.

Referring now to the drawing and to Fig. 1 in particular, there is illustrated an application of my invention to an ordinary power supply circuit or distribution system in which a circuit interrupter 10 may be used to control the flow of current from the supply conductors 11 to the load conductors 12.

The circuit breaker 10 is provided with a closing solenoid 13 and an opening or tripping solenoid 14. The energization of the closing solenoid may be controlled in any suitable manner, such, for example, as by means of a push-button switch 15, which may be closed to complete an obvious energizing circuit for the closing solenoid 13 across the power supply conductors 11.

It is usually desirable in systems of this kind to normally control the tripping of the circuit interrupter by means of voltage or energy taken directly from the supply circuit or bus and usually it is not practical or economic to provide some other form of auxiliary current supply which is entirely independent of the supply circuit and which might be utilized for effecting the opening of the interrupter in the event that the voltage of the supply circuit failed or became of such low value as to be ineffective to effect the tripping operation of the interrupter.

In order to provide for utilizing the voltage of the supply circuit both directly and indirectly for controlling the operation of the circuit interrupter or other devices in the system, and at the same time provide for positively tripping the interrupter regardless of the failure of voltage of the supply circuit, provision is made for energizing the tripping solenoid 14 under normal conditions from the supply circuit 11 through a suitable electric valve 16. Any suitable form of electric valve may be used, such for example, as a full wave rectifier, as illustrated.

As shown, the input terminals of the rectifier 16 are connected directly across the supply conductors 11 while the output terminals are connected to the tripping solenoid 14.

The energizing circuit for the tripping solenoid 14 may be controlled in any suitable manner such, for example, as by means of an overload relay 17 having its winding connected to a current transformer 18, which provides for automatically closing the energizing circuit to trip the interrupter in response to an overload condition on the supply circuit. It is to be understood, however, that any other suitable device may be utilized to control the energizing circuit in response to any other desired circuit condition.

As will be readily understood, the rectifier 16 supplies direct current for tripping the interrupter upon the operation of the overload relay 17 so long as the voltage of the supply circuit 11 is of sufficient value to provide the necessary current. However, in the event of heavy overload conditions or short circuits, the voltage of the supply circuit may drop to zero or to a very low value, in which event the operation of the overload relay 17 would be ineffective to trip the breaker at this critical period.

In order to positively trip the breaker under conditions of this kind, there is provided an auxiliary source of voltage in the form of an energy storing device, such, for example as a condenser 19, as shown. The condenser is connected across the output terminals of the rectifier 16 and in parallel circuit relation with the tripping solenoid 14. As will be readily understood, the condenser 19 is maintained in a fully charged condition so long as the supply circuit is energized and upon the closure of the overload relay 17, the condenser discharges through the tripping solenoid 14 regardless of whether or not voltage from the output terminals of the rectifier is being impressed upon the energizing circuit.

As will be readily understood, the full discharge of the condenser is utilized in energizing the tripping solenoid 14 since the condenser is prevented from discharging into the supply circuit by means of the valve action of the rectifier 16.

It will be readily understood that the system of Fig. 1, is operative from either a direct or alternating current supply source.

In Fig. 2 of the drawing, there is illustrated a modification which is particularly adapted for direct-current circuits in which the condenser 19 is connected in series circuit relation with an electric valve or half-wave rectifier 21, as shown, directly across the supply conductors 11. In this instance, the condenser 19 is also connected in parallel with the tripping solenoid 14, the energizing circuit for which is controlled by the overload relay 17 in exactly the same manner as in Fig. 1.

In this system the solenoid 14, upon the closure of the overload relay 17, is energized by direct current from either the supply circuit or the condenser 19, or both, dependent upon their relative voltages. In the event of very low or short circuit voltage conditions substantially all of the energy is supplied the condenser. As in Fig. 1, the valve action of the rectifier prevents the condenser from discharging into the supply circuit.

In Fig. 3 of the drawing, I have illustrated the application of my invention to a distribution system in which a load 22 is supplied with direct current power through a load circuit comprising conductors 23 and 24 by means of a mercury arc power rectifier 25 connected in the usual manner to an alternating current supply circuit 26 by means of a suitable transformer 27.

As shown, the three-phase primary winding 28 of the transformer is connected to the alternating current source while the secondary 29 is connected to the anodes 31 of the power rectifier and the load conductors 23 and 24 are connected to the transformer system and the rectifier cathode 32, respectively, in the usual manner.

In order to illustrate a system in which it may be often times desirable to maintain relays, switches and circuit interrupters in their operating positions regardless of fluctuations of voltage on the load circuit, as well as, to effect the operation of these devices when desired regardless of the voltage of the load circuit from which they are normally energized, there is shown in connection with the rectifier 25 a filter circuit 33 and an inductance 34 which are commonly used in connection with rectifiers of this kind to prevent telephone interference.

As described hereinbefore, the use of such filtering equipment in connection with mercury arc rectifiers may cause voltage instability of the load circuit when the rectifier is operating under light load conditions. In fact voltage instability is often obtained under adverse temperature and load conditions even through the interference mitigation apparatus is not used.

Under such conditions of voltage instability, the voltage of the load circuit fluctuates between wide limits thereby requiring that provisions be made for energizing the various control relays and switches from an auxiliary source during these periods.

In the distribution system shown, a high speed circuit interrupter 35 may be utilized for controlling the load circuit. As shown, the circuit interrupter is provided with an opening spring 36 and a closing solenoid 37 which may be energized in any suitable manner, such as by means of a push button switch 38, to close the interrupter.

The interrupter is provided with the electromagnetic holding and tripping element 39 comprising a movable armature 41 and a stationary pole piece 42 which in this instance is provided with a holding coil 43 and a tripping coil 44 connected in flux opposition. The interrupter is also provided with a bucking bar 45 connected in series with the load in order to provide for tripping the interrupter in response to the reversal of the flow of current in the load circuit.

In this instance, the energization of the holding and tripping coils 43 and 44 may be controlled by means of an auxiliary relay 46 provided with normally closed contact members 47 for controlling the holding coil 43 and normally open contact members 48 for controlling the tripping coil 44.

The relay 46 may be controlled by means of an overload relay 51 having its operating winding connected to a suitable shunt 52 in the load conductor 24 or by means of any other suitable device in response to any desired circuit condition. In this instance, uni-directional current is obtained from the load circuit for energizing the various relays, and the holding and tripping coils of the interrupter, by means of an electric valve 53 which, as in Fig. 2, is connected directly across the load circuit in series with a condenser 54.

Assuming that the circuit interrupter has been closed, and that a sufficient overload appears on the load circuit to operate the overload relay 51, an energizing circuit is established for operating the control relay 46 which extends from conductor 23 through the rectifier 53, conductor 55, coil of relay 46, contact members of the overload relay 51, and conductor 56 to the load conductor 24.

As will be readily understood, the completion of this circuit connects the condenser 54 in parallel circuit relation with the operating coil of relay 46 so that should there not be sufficient voltage on the load circuit to operate the relay, the discharge of the condenser supplies the necessary current for operating the relay. In this instance also the condenser is prevented from discharging back into the load circuit by means of the rectifier 53.

Upon the operation of the control relay 46, its contact members 57 are closed to complete an obvious holding circuit while contact members 48 are closed to energize the tripping coil 44 and contact members 47 are opened to deenergize the holding coil 43. The breaker is thus actuated to open position by means of spring element 36 or in any other manner depending upon the design of the breaker.

In order to clearly describe the functioning ef my invention to maintain the interrupter 35 in the closed position, during the periods when the voltage of the load circuit may become unstable, it may be assumed that the interrupter is in the closed position and the control relay 46 in the normal open position as shown, thereby completing the energizing circuit for the holding coil 43.

Under these conditions, in the event that the voltage of the direct current load circuit fluctuates widely, there will be times when there is very little or insufficient voltage for properly energizing the holding coil 43. At such times, since the condenser 54 is maintained in the fully charged condition, it will automatically discharge through a circuit comprising conductor 55, closed contact member 47, holding coil 43, shunt 52 and conductor 56 back to the other terminal of the condenser. It is apparent that sufficient discharge voltage is available under these conditions to maintain the holding coil 43 sufficiently energized to maintain the circuit interrupter in the closed position.

It will also be apparent that the condenser and electric valve arrangement shown may be also used to maintain certain control relays and switches in predetermined operating conditions when they are applied to distribution systems of this kind or to electrical control systems in general.

In view of the foregoing description, it is evident that I have provided a very inexpensive and simple arrangement which may be utilized as an ever-ready auxiliary source of voltage to effect the positive control of relays, switches and circuit interrupters in systems wherein there is considerable likelihood of a failure in the normal voltage supply and also where it is uneconomical or impractical to provide an auxiliary source of current in the form of a separate storage battery or otherwise which is entirely independent of source of voltage normally supplying current for operating these devices.

It is believed that my invention may be utilized in electrical systems of almost any nature wherein an auxiliary source of voltage is desired suitable for use under emergency conditions and which is not difficult or expensive to maintain in an efficient operating condition.

It may be stated in conclusion that while the illustrated examples constitute practical embodiments of my invention, I do not wish to limit myself strictly to the exact details illustrated since some modifications of the same may be made without departing from the spirit of the invention as defined in the appended claims.

I claim as my invention:

1. In combination, a load circuit, means for supplying power to the load circuit, a circuit interrupter interposed in the load circuit, said circuit interrupter having a holding coil and a tripping coil, means for closing the interrupter, a relay disposed to be energized from the load circuit and operable to control the energization of the holding and tripping coils, over-load responsive means for controlling the operation of said relay, and means including a condenser maintained in a charged condition from the power supplying means and serving as an auxiliary source to energize the relay upon the operation of the overload responsive means and to energize the holding coil of the interrupter in the event that the voltage of the load circuit becomes reduced to an ineffective value.

2. The combination with a load circuit and means for supplying power to the load circuit, said power-supplying means being inherently unstable under predetermined operating conditions thereby causing fluctuations of the voltage of the load circuit, of a circuit interrupter for controlling the load circuit, said interrupter having holding and tripping coils, means for closing the interrupter, a relay disposed when in one position to maintain the holding coil energized from the load circuit and operable to deenergize said holding coil and energize the trip coil from the load circuit, a rectifier, and a condenser connected to be energized from the load circuit through the rectifier and disposed to automatically supply energy to the holding coil in the event that the voltage of the load fluctuates to such an extent that the energy received from the load circuit is insufficient to maintain the holding coil properly energized.

3. The combination with a load circuit, a vapor-electric translating system supplying power to the load circuit and means associated with the vapor-electric translating system whereby under predetermined load conditions the output voltage of the rectifier may become unstable, of a circuit breaker interposed in the load circuit, said breaker having holding and tripping coils, means for closing the circuit breaker, circuits for energizing the holding and tripping coils from the load circuit, a relay having an operating coil for controlling said circuits, said relay being disposed when in one position to close the energizing circuit for the holding coil and operable when energized to open said circuit and close the circuit to the trip coil, means responsive to a predetermined condition of the load circuit for energizing the relay from the load circuit, a rectifier and a condenser connected across the load circuit in series with the rectifier, said condenser being connected to discharge through the operating coil of the relay and the holding coil of the breaker, thereby to provide for effecting the opening of the breaker in response to the operation of the means responsive to a predetermined condition of the load circuit regardless of the voltage of the load circuit and to maintain the breaker closed regardless of fluctuations of the voltage of the load circuit.

4. The combination with a load circuit and means for supplying power to the load circuit, said power-supplying means being inherently unstable under predetermined operating conditions thereby causing fluctuations of the voltage of the load circuit, of a circuit interrupter for controlling the load circuit, said circuit interrupter having holding and tripping coils, a control circuit including a rectifier element for energizing the holding and tripping coils from the load circuit, means including a control relay operable in accordance with predetermined conditions of the load circuit for controlling the control circuit, and a condenser connected to be charged from the load circuit through the rectifier element for automatically energizing the holding coil by discharging therethrough to maintain the interrupter closed during periods of voltage fluctuation on the load circuit and to energize the tripping coil dependent upon the operation of the control relay.

HERBERT A. ROSE.